United States Patent [19]

Bauer et al.

[11] Patent Number: 4,493,545
[45] Date of Patent: Jan. 15, 1985

[54] FILM CASSETTE

[75] Inventors: Walter Bauer; Heinrich Färber; Jürgen Müller, all of München, Fed. Rep. of Germany

[73] Assignee: AGFA-Gevaert Aktiengesellschaft, Leverkusen, Fed. Rep. of Germany

[21] Appl. No.: 315,435

[22] Filed: Oct. 27, 1981

[30] Foreign Application Priority Data

Oct. 30, 1980 [DE] Fed. Rep. of Germany ....... 3040819

[51] Int. Cl.³ .............................................. G03B 17/32
[52] U.S. Cl. .................................. 354/277; 354/281; 354/284
[58] Field of Search ................................ 354/276–285; 355/72; 250/481; 378/188

[56] References Cited

U.S. PATENT DOCUMENTS

| 271,826 | 2/1883 | Flammang | 354/283 |
| 1,933,823 | 11/1933 | Nagel et al. | 354/284 |
| 2,339,658 | 1/1944 | Smith | 354/283 X |
| 3,537,376 | 11/1970 | Fleming | 354/277 |
| 3,695,424 | 10/1972 | Cristy et al. | 206/455 |
| 4,110,624 | 8/1978 | Conteas | 250/481 |

FOREIGN PATENT DOCUMENTS 1155670 10/1963 Fed. Rep. of Germany ...... 354/276

Primary Examiner—John Gonzales
Attorney, Agent, or Firm—Kontler, Grimes & Battersby

[57] ABSTRACT

A cassette for sheet film has a cover and a bottom which are hinged to one another along a longitudinal edge of the cassette. Locking elements for locking the cover and bottom when the cassette is closed are arranged at the opposite longitudinal edge of the cassette. The cover and bottom cooperate to define a film compartment and the bottom has a rigid, flat wall for supporting a sheet of film. The cover has a window for exposing the film in the compartment and is further provided with a slot which slidably receives a shield for protecting the film against light until such time as the film is to be exposed. A resilient rim is mounted on the cover and extends around the window. The rim is arranged to press the margins of the film against the rigid wall of the bottom when the cassette is closed. The hinged connection of the cover and the bottom causes the rim to contact the film progressively as the cassette is closed so that the rim stretches the film flat over the rigid wall of the bottom. The pressure of the rim on the margins of the film after the cassette has been closed insures that the film remains flat regardless of the orientation of the cassette.

44 Claims, 6 Drawing Figures

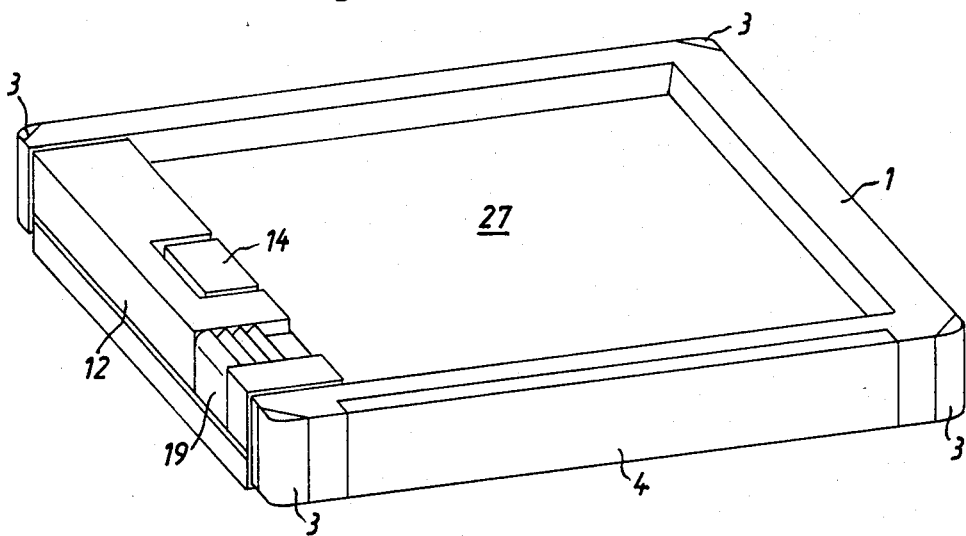

FILM CASSETTE

BACKGROUND OF THE INVENTION

The invention relates generally to a film cassette.

More particularly, the invention relates to a film cassette for sheet film.

A known cassette for sheet film has upper and lower cassette portions which cooperate to define a film compartment. The upper cassette portion has a window via which the film is exposed. A shield for blocking the window and thus preventing undesired exposure of the film is slidably received in a slot provided in the upper cassette portion. In addition to the shield, the upper and lower cassette portions have cooperating sealing portions which prevent light from entering the film compartment.

Film cassettes of this type are known as CRT cassettes and are used in cameras, primarily multiple image cameras, which are designed to accept film in the form of sheets.

Multiple image cameras are used to obtain reproductions of differing size of images formed on high resolution screens. Many reproductions (25 or more) may be produced on a single sheet of film or, alternatively, a single sheet of film may be used for a single reproduction. It is even possible to obtain many reproductions on a single sheet of film with a single exposure. These multiple image cameras are used mainly for medical purposes.

A film cassette for use in a multiple image camera is known from the German Pat. No. 27 50 559. The film cassette is normally placed in the camera with the window facing downwards. After removal of the shield, the film is exposed by light travelling towards it from below.

A movable pressure plate is provided to keep the film flat. The pressure plate is urged towards the window by means of resilient strips or fingers which are actuated via follower controls, e.g. cam-operated controls. It has been found, however, that the film sags in the middle so that the reproductions are blurry. This is particularly true for large sheets of film. The sagging results from the fact that the pressure plate does not press against the frame of the window uniformly. This enables air to penetrate the area between the film and the pressure plate, which, in turn, leads to sagging of the film.

Furthermore, the known cassette referred to above is designed exclusively for automatic loading and unloading. This requires an extremely complicated mechanism to release the pressure which the pressure plate applies to the film and to swing away a flap which covers a slit for insertion and removal of the film. In addition, the exposed film must be removed from, and a fresh sheet of film inserted into, the cassette via the slit. Not only is the mechanism which performs these functions expensive but the introduction of the film into the slit is complicated since the latter is small.

OBJECTS AND SUMMARY OF THE INVENTION

It is an object of the invention to provide a film cassette which enables sagging of the film to be avoided.

Another object of the invention is to provide a film cassette which may be loaded and unloaded in a simple manner.

An additional object of the invention is to provide an improved sheet film cassette of the type described above which is simpler to handle and yields reproductions of better quality than the presently known cassettes of this type.

These objects, and others which will become apparent as the description proceeds, are achieved by the invention.

One aspect of the invention resides in a film cassette, particularly for sheet film, which includes a pair of cooperating cassette portions movable between an open position and a closed position in which the cassette portions define a film compartment. One of the cassette portions has a supporting wall for the film while the other cassette portion has a rim arranged to press the film against the supporting wall in the closed position of the cassette portions.

In the following description, the cassette portion with the rim will be referred to as the upper cassette portion while the cassette portion with the supporting wall will be referred to as the lower cassette portion.

The upper cassette portion may have a window for exposing the film. The upper cassette portion may further be provided with a slit which slidably receives a shield or light-blocking member for the window so as to prevent the undesired entry of light into the film compartment via the window.

The upper and lower cassette portions may have cooperating sealing portions to prevent the penetration of light into the film compartment from locations other than the window.

In a preferred embodiment of the invention, the supporting wall on the lower cassette portion is rigid while the rim on the upper cassette portion is resilient and extends around the window. Furthermore, the upper and lower cassette portions are connected with one another along one side by means of a hinge. Arresting means is provided on the opposite side and serves to arrest the cassette portions in the closed position thereof.

The provision of a hinge connection between the upper and lower cassette portions makes it possible to open the cassette with a simpler mechanism and to change the film more easily than heretofore. Moreover, the hinge connection in conjunction with the resilient rim which extends circumferentially of the window ensures that the film is firmly held against the supporting wall so that sagging of the film when the cassette is placed upside down is avoided. When the cassette is in the process of being closed, the hinge connection causes the resilient rim to come into contact with the film progressively rather than abruptly so that the film is properly "stretched out" on the supporting wall.

According to one embodiment of the invention, the improved handling characteristics of the cassette are made even better in that the shield can be removed from the upper cassette portion only by pressing a pushbutton. This prevents the shield from sliding partially or entirely out of its slot if the cassette is dropped.

Another embodiment of the invention has a locking means for the shield which performs a dual function. On the one hand, the locking means indicates whether or not the film in the cassette has already been exposed. On the other hand, the locking means prevents the shield from being removed accidentally once the film has been exposed.

An additional embodiment of the invention includes an indicator which indicates whether or not the cassette is loaded.

The novel features which are considered as characteristic of the invention are set forth in particular in the appended claims. The improved cassette itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is a perspective view of the cassette of FIG. 1 as seen from below.

DESCRIPTION OF THE PREFERRED EMBODIMENTS

Figure 1:
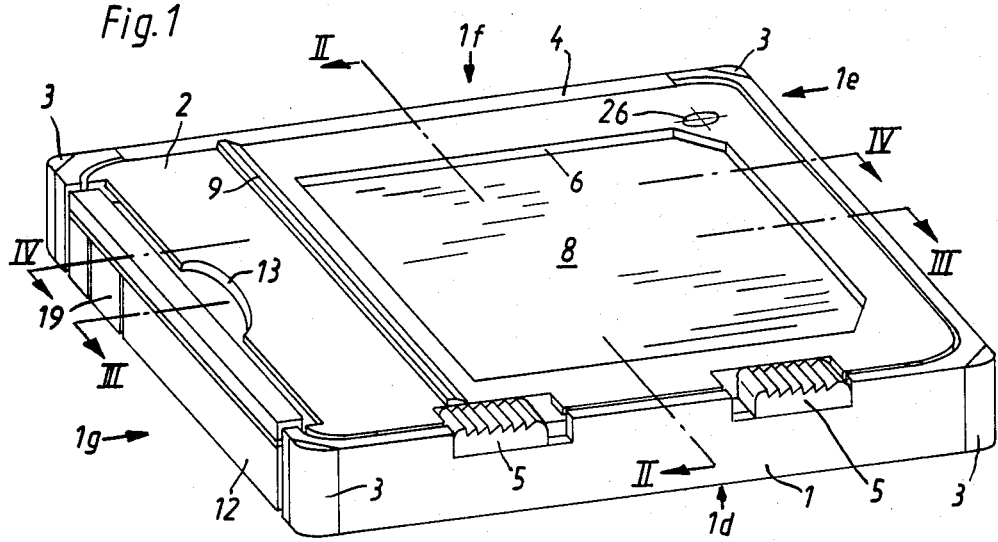
FIG. 1 is a perspective view of a film cassette according to the invention as seen from above.

FIG. 1 illustrates a cassette having a lower cassette portion or bottom 1 and an upper cassette portion or cover 2. The lower and upper cassette portions 1 and 2 are connected with one another along a longitudinal edge of the cassette by means of a flexible hinge 4. Arresting elements 5 are mounted in the lower cassette portion 1 at the longitudinal edge of the cassette opposite the hinge 4. The arresting elements 5 cooperate with non-illustrated pegs on the upper cassette portion 2 to lock the lower and upper cassette portions 1 and 2 when the cassette is closed.

Figure 2:
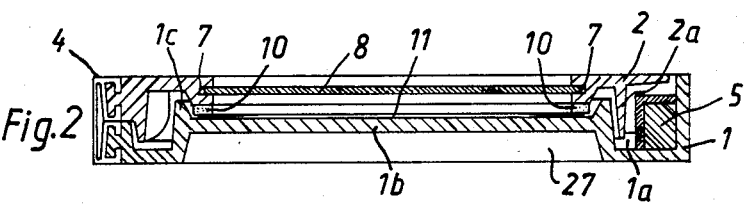
FIG. 2 is a transverse sectional view in the direction of the arrows II—II of FIG. 1.

The lower cassette portion 1 is rigid. With reference to FIGS. 1 and 2, the lower cassette portion 1 includes a flat, rigid supporting or bottom wall 1b as well as rigid side walls 1d, 1e and 1f. The side walls 1d, 1e and 1f have a height approximating the overall thickness of the cassette. Resilient elements 3 are arranged at the four corners of the lower cassette portion 1.

The lower cassette portion 1 has an open side 1g. In addition, the lower cassette portion 1 is formed with a labyrinthine recess 1a.

As illustrated in FIG. 2, the upper cassette portion 2 is provided with a protuberance 2a which projects into the recess 1a of the lower cassette portion 1. The recess 1a and protuberance 2a cooperate to seal the interior of the cassette against light.

Figure 3:
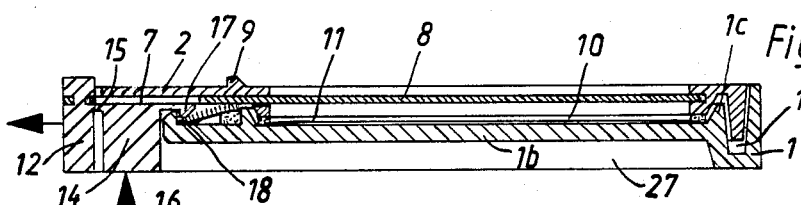
FIG. 3 is a longitudinal sectional view in the direction of the arrows III—III of FIG. 1.

Referring to FIGS. 1-3, the upper cassette portion 2 has a cutout 6 which constitutes a window for exposing a sheet of film 11 located inside the cassette. A light-blocking member or shield 8 for preventing the undesired passage of light through the window 6 is slidably mounted in a slot 7 formed in the upper cassette portion 2. The slot 7 has an opening in the region of the open side 1g of the lower cassette portion 1 through which the light-blocking member 8 may be inserted into and withdrawn from the cassette.

A rib 9 is formed on the external surface of the upper cassette portion 2 in the region of the open side 1g of the lower cassette portion 1. When the cassette is placed in a camera, the rib 9 cooperates with the camera to prevent light coming from the direction of the open side 1g of the lower cassette portion 1 from reaching the window 6.

A resilient rim 10, which is advantageously composed of a foamed material, is mounted on the internal surface of the upper cassette portion 2. The rim 10 is circumferentially complete and extends all around the window 6. The rim 10 is arranged to press against the flat supporting wall 1b of the lower cassette portion 1 when the cassette is closed.

The supporting wall 1b of the lower cassette portion 1 is provided with a rigid, rectangular lip 1c which surrounds the rim 10. The lip 1c bounds an area which is equal in size to the film 11 and receives the same and the surface of the lip 1c facing this area is inclined away therefrom. Accordingly, the lip 1c accurately positions the film 11 while the resilient rim 10 comes to rest upon the marginal portions thereof and thus presses the film 11 against the supporting wall 1b of the lower cassette portion 1. Since the rim 10 is circumferentially complete and comes into contact with the film 11 progressively rather than abruptly due to the hinge connection between the lower cassette portion 1 and the upper cassette portion 2, air is prevented from penetrating into the area between the supporting wall 1b and the film 11. Accordingly, the latter remains pressed flat against the supporting wall 1b even when the cassette is turned so that the window 6 faces downwards.

It will be seen that the supporting wall 1b and lip 1c of the lower cassette portion 1 cooperate with the upper cassette portion 2 to define a compartment for the film 11.

With reference to FIG. 1, the light-blocking member 8 has a gripping portion or handle 12 which is located in the region of the open side 1g of the lower cassette portion 1 when the light-blocking member 8 is in the cassette. A notch 13 is formed in the upper cassette portion 2 to facilitate gripping of the gripping portion 12.

As best seen in FIG. 3, a pushbutton or arresting member 14 is mounted on the side of the gripping portion 12 facing the film compartment. The pushbutton 14 is connected with the gripping portion 12 via a thin web 15 so that the pushbutton 14 can be resiliently displaced in the direction of the arrow 16. The pushbutton 14 has a hook-like portion 17 which is arranged to cooperate with a hook-like ledge 18 on the lower cassette portion 1. When the light-blocking member 8 is pushed into the cassette, the hook-like portion 17 of the pushbutton 14 engages the hook-like ledge 18 of the lower cassette portion 1. The hook-like portion 17 can be disengaged from the hook-like ledge 18 only by depressing the pushbutton 14 in the direction of the arrow 16. Among other things, this prevents the light-blocking member 8 from being pulled out of the cassette accidentally.

Figure 4A:
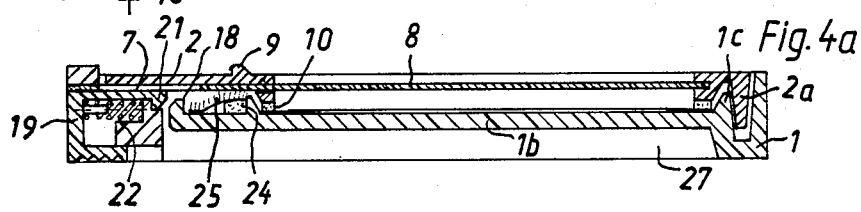
FIGS. 4a and 4b are longitudinal sectional views in the direction of the arrows IV—IV of FIG. 1 illustrating two different conditions of the cassette.
Figure 4B:
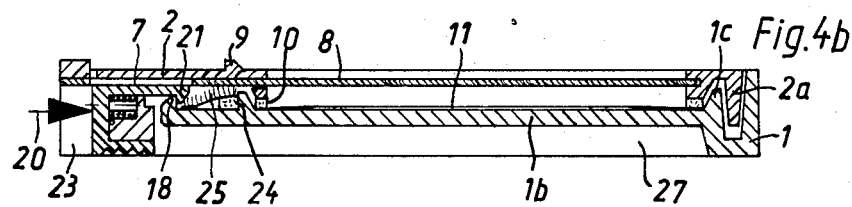

As most clearly illustrated in FIGS. 4a and 4b, a sliding locking member or detent 19 is mounted on the gripping portion 12. The locking member 19 is U-shaped and mounted on the gripping portion 12 for sliding movement in the direction of the arrow 20. The locking member 19 has a hook-like portion 21 which is again arranged to cooperate with the hook-like ledge 18 of the lower cassette portion 1. A spring 22 is located between the gripping portion 12 and the locking member 9 and urges the latter into the inoperative position illustrated in FIGS. 1, 4a and 5. When the locking member 19 is moved in the direction of the arrow 20, it assumes the operative position illustrated in FIG. 4b in which the hook-like portion 21 thereof engages the hook-like ledge 18 of the lower cassette portion 1. The hook-like portion 21 and hook-like ledge 18 can be disengaged from one another only by opening the cassette since this is the only manner in which the relative motion required for disengagement may be achieved. When the locking member 19 is moved to its operative position by a worker after the film 11 has been exposed, the locking member 19 prevents withdrawal of the light-blocking member 8 from the cassette. This provides the advantage that the film 11 cannot be accidentally exposed for a second time. Furthermore, the location of the blocking member 19 when it is in its operative position serves as an indicator that the film 11 has already been exposed. This may be indicated even more clearly by coloring and thereby accentuating the surface portion 23 of the gripping portion 12 which becomes exposed when the locking member 19 is pushed to its operative position.

A resilient sealing member is mounted on the lower cassette portion 1 in the region of the open side 1g thereof and externally of the lip 1c bounding the film compartment. With reference to FIGS. 3, 4a and 4b, the sealing member includes a resilient strip 24, which is preferably composed of a foamed material, provided with a pile layer 25 which faces the upper cassette portion 2. The resilient strip 24 urges the pile layer 25 towards the upper cassette portion 2. When the light-blocking member 8 is in the cassette, the pile layer 25 bears against the light-blocking member 8. However, when the light-blocking member 8 is removed from the cassette, the resilient strip 24 urges the pile layer 25 into engagement with the upper cassette portion 2. This prevents light from entering the film compartment via the open end of the slot 7 which accommodates the light-blocking member 8.

As shown in FIGS. 2, 3, 4a, 4b and 5, the exterior or bottom of the lower cassette portion 1 has an external recess 27 which is adapted to accommodate the light-blocking member 8 during an exposure.

The upper cassette portion 2 may be provided with an indicator 26 for indicating whether or not the cassette is loaded. The indicator 26 may be designed in accordance with the German patent application No. P 28 38 058.7.

In operation, the cassette is placed in an automatic loading and unloading station where the arresting elements 5 are displaced so as to unlock the lower cassette portion 1 and upper cassette portion 2. The upper cassette portion 2 is lifted and a sheet of film 11 is placed in the space bounded by the rigid lip 1c. The upper cassette portion 2 is then swung closed and the arresting elements 5 displaced to lock the upper cassette portion 2 and lower cassette portion 1. The cassette is then inserted in a camera where the pushbutton 14 is depressed while the light-blocking member 8 is simultaneously withdrawn from the cassette by pulling the gripping portion 12 thereof. The resilient strip 24 urges the pile layer 25 into engagement with the upper cassette portion 2 so that the slot 7 which receives the light-blocking member 8 is sealed against light. Furthermore, the rib 9 on the upper cassette portion 2 cooperates with the camera to seal any gap which may exist between the upper cassette portion 2 and the camera and thus prevent light travelling from the direction of the open side 1g of the lower cassette portion 1 from reaching the window 6. The resilient rim 10 stretches the film 11 over the supporting wall 1b of the lower cassette portion 1 so that the film 11 does not sag even when the cassette is positioned with the window 6 facing downwards for an extended period of time.

After the exposure, the light-blocking member 8 is again inserted into the cassette. The locking member 19 is then moved to its operative position. This action locks the light-blocking member 8 in the cassette and also indicates that the film 11 has been exposed. The cassette is returned to the loading and unloading station where the lower cassette portion 1 and upper cassette portion 2 are unlocked as before. It is only when the upper cassette portion 2 is swung away from the lower cassette portion 1 that the locking member 19 is free to return to its inoperative position which it does under the urging of the spring 22.

It will be understood that the cassette of the invention can be readily loaded and unloaded manually as well as automatically which is not possible with the prior art cassette discussed earlier.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A film cassette, particularly for sheet film, comprising:
   (a) a pair of cooperating cassette portions movable between an open position and a closed position in which said cassette portions define a film compartment, one of said cassette portions having a supporting wall for the film and the other of said cassette portions having a window which is superimposed with said film compartment in said closed position;
   (b) a hinge connecting said cassette portions for pivotal movement between said open and closed positions;
   (c) a light-blocking member for said window receivable by said other cassette portion and designed to seal said film compartment against light; and
   (d) a resilient rim projecting from said other cassette portion and having an end face which is directed towards said supporting wall in said closed position and is arranged to press the film against the same in such position, said rim extending around said window.

2. A film cassette, particularly for sheet film, comprising:
   (a) a pair of cooperating cassette portions movable between an open position and a closed position in which said cassette portions define a film compartment, one of said cassette portions having a supporting wall for the film, and the other of said cassette portions being provided with a window which is superimposed with said film compartment in said closed position;
   (b) a rim projecting from said other cassette portion and having an end face which is directed towards said supporting wall in said closed position and is arranged to press the film against the same in such position, said rim extending around said window; and
   (c) a light-blocking member for said window arranged to seal said film compartment against light, said other cassette portion being provided with a slot which slidably receives said light-blocking member.

3. The film cassette of claim 2, comprising a lip on said supporting wall which bounds said film compartment and surrounds said rim in said closed position, and a sealing member on said one cassette portion which is located externally of said lip and normally engages said light-blocking member in said closed position; and wherein said slot has an inlet end which is located in the region of said sealing member in said closed position and the latter is arranged to engage said other cassette portion when said light-blocking member is removed from said slot to thereby seal said film compartment against light from said inlet end of said slot.

4. The film cassette of claim 3, wherein said sealing member comprises a pile layer which faces said other cassette portion and is arranged to engage the same in said closed position.

5. The film cassette of claim 3, wherein said sealing member is resilient.

6. The film cassette of claim 2, wherein said light-blocking member includes a gripping portion, and an arresting member on said gripping portion for arresting said light-blocking member in said slot.

7. The film cassette of claim 6, wherein said arresting member and said one cassette portion cooperate in said closed position to arrest said light-blocking member in said slot.

8. The film cassette of claim 7, said arresting member being resiliently connected to said gripping portion; and wherein said arresting member and said one cassette portion include cooperating hook-like portions arranged to be disengaged from one another in response to displacement of said arresting member relative to said gripping portion.

9. The film cassette of claim 2, comprising a locking member movable between an inoperative position and an operative position in which said locking member prevents removal of said light-blocking member from said slot in said closed position.

10. The film cassette of claim 9, wherein said locking member is slidable between said inoperative and operative positions.

11. The film cassette of claim 9, said light-blocking member including a gripping portion; and wherein said locking member is mounted on said gripping portion.

12. The film cassette of claim 9, wherein said locking member and said one cassette portion cooperate in said operative position to prevent removal of said light-blocking member from said slot.

13. The film cassette of claim 12, wherein said locking member and said one cassette portion include hook-like portions which cooperate in said operative position to prevent removal of said light-blocking member from said slot.

14. The film cassette of claim 9, comprising biasing means for urging said locking member towards said inoperative position.

15. The film cassette of claim 14, wherein said biasing means comprises a spring.

16. The film cassette of claim 2, said light-blocking member including a gripping portion; and further comprising a rib on said other cassette portion in the region of said gripping portion for sealing said window against light travelling towards said window from the direction of said gripping portion when said film cassette is placed in a camera and said light-blocking member is removed from said slot.

17. The film cassette of claim 2, wherein said one cassette portion is provided with an external recess for temporarily storing said light-blocking member.

18. A film cassette, particularly for sheet film, comprising:
(a) a pair of cooperating cassette portions movable between an open position and a closed position in which said cassette portions define a film compartment, one of said cassette portions having a supporting wall for the film, and the other of said cassette portions being provided with a window which is superimposed with said film compartment in said closed position;
(b) a rim projecting from said other cassette portion and having an end face which is directed towards said supporting wall in said closed position and is arranged to press the film against the same in such position, said rim extending around said window; and
(c) a light-blocking member for said window arranged to seal said film compartment against light, said other cassette portion being provided with a slot which slidably receives said light-blocking member, said light-blocking member including a gripping portion, and an arresting member on said gripping portion for arresting said light-blocking member in said slot, said arresting member and said one cassette portion cooperating in said closed position to arrest said light-blocking member in said slot, and said arresting member comprising a pushbutton for disengaging said arresting member from said one cassette portion.

19. A film cassette, particularly for sheet film, comprising:
(a) a pair of cooperating cassette portions having a window and movable between an open position and a closed position in which said cassette portions define a film compartment superimposed with said window;
(b) a light-blocking member for said window receivable by one of said cassette portions and designed to seal said film compartment against light; and
(c) a locking member for said light-blocking member movable between an inoperative position and an operative position in which said locking member prevents removal of said light-blocking member from said one cassette portion in said closed position, said locking member being mounted on said light-blocking member and being arranged to cooperate with the other of said cassette portions in said closed position to prevent removal of said light-blocking member from said one cassette portion.

20. The film cassette of claim 19, wherein said locking member is mounted on said light-blocking member for sliding movement between said inoperative and operative positions.

21. The film cassette of claim 19, wherein said locking member and the other of said cassette portions comprise hook-like portions which cooperate in said operative position to prevent removal of said light-blocking member from said one cassette portion.

22. The film cassette of claim 19, wherein said locking member and the other of said cassette portions include locking portions which cooperate in said closed position to prevent removal of said light-blocking member from said one cassette portion, said locking portions being disengageable by relative movement of said locking member and said other cassette portion in a predetermined direction, and said one cassette portion preventing such relative movement in said closed position.

23. The film cassette of claim 19, comprising biasing means for urging said locking member towards said inoperative position.

24. A film cassette, particularly for sheet film, comprising:
   (a) a pair of cooperating cassette portions movable between an open position and a closed position in which said cassette portions define a film compartment, one of said cassette portions having a supporting wall for the film, and the other of said cassette portions being provided with a window which is superimposed with said film compartment in said closed position; and
   (b) pressing means on said other cassette portion projecting away from said window and towards said supporting wall in said closed position, said pressing means being arranged to press the film against said supporting wall in said closed position, and said pressing means being disposed about said window.

25. The film cassette of claim 24, wherein said supporting wall is rigid.

26. The film cassette of claim 24, wherein said pressing means comprises a foamed material.

27. The film cassette of claim 24, comprising cooperating sealing portions on said cassette portions to seal said film compartment against light.

28. The film cassette of claim 27, said cassette portions having marginal sections; and wherein said sealing portions are located at said marginal sections.

29. The film cassette of claim 28, wherein said sealing portions have a labyrinthine configuration.

30. The film cassette of claim 24, comprising a hinge which pivotally connects said cassette portions with one another.

31. The film cassette of claim 30, said hinge being located at one side of said cassette portions; and further comprising arresting means at the opposite side of said cassette portions for arresting said cassette portions in said closed position.

32. The film cassette of claim 24, wherein said one cassette portion constitutes a bottom and said other cassette portion constitutes a top of said film cassette.

33. The film cassette of claim 24, wherein said supporting wall is provided with a lip which is disposed about said film compartment and said pressing means in said closed position.

34. The film cassette of claim 33, wherein said lip is rigid.

35. The film cassette of claim 33, wherein said lip is rectangular.

36. The film cassette of claim 33, wherein said lip delimits said film compartment.

37. The film cassette of claim 24, wherein said rim is arranged to directly engage the film.

38. The film cassette of claim 24, wherein said pressing means comprises a rim which extends around said window.

39. The film cassette of claim 38, wherein said rim is located adjacent to said window.

40. The film cassette of claim 24, wherein said pressing means is resilient.

41. The film cassette of claim 24, comprising a light-blocking member for said window arranged to seal said film compartment against light entering said window; and wherein said light-blocking member is slidably mounted on said other cassette portion.

42. The film cassette of claim 41, wherein said light-blocking member is provided with an arresting member for arresting said light-blocking member in a position in which said light-blocking member seals said film compartment against light entering said window.

43. The film cassette of claim 42, said light-blocking member having a gripping portion; and wherein said arresting member is provided on said gripping portion.

44. A film cassette, particularly for sheet film, comprising:
   (a) a pair of cooperating cassette portions movable between an open position and a closed position in which said cassette portions define a film compartment, one of said cassette portions having a supporting wall for the film, and the other of said cassette portions being provided with a window which is superimposed with said film compartment in said closed position; and
   (b) a resilient rim projecting from said other cassette portion and having an end face which is directed towards said supporting wall in said closed position and is arranged to press the film against the same in such position, said rim extending around said window.

* * * * *